US008820154B2

(12) United States Patent
Kanenari

(10) Patent No.: US 8,820,154 B2
(45) Date of Patent: Sep. 2, 2014

(54) TRANSMISSION DEVICE FOR TRANSMITTING INFORMATION RELATING TO CONDITION OF TIRE, TIRE ASSEMBLY, AND TIRE CONDITION MONITORING SYSTEM

(75) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/980,007

(22) PCT Filed: Jan. 17, 2012

(86) PCT No.: PCT/JP2012/000234
§ 371 (c)(1),
(2), (4) Date: Jul. 16, 2013

(87) PCT Pub. No.: WO2012/098858
PCT Pub. Date: Jul. 26, 2012

(65) Prior Publication Data
US 2013/0298658 A1 Nov. 14, 2013

(30) Foreign Application Priority Data
Jan. 18, 2011 (JP) ................................ 2011-008054

(51) Int. Cl.
*B60C 23/02* (2006.01)
*B60C 23/04* (2006.01)

(52) U.S. Cl.
CPC ................................ *B60C 23/0483* (2013.01); *B60C 23/0494* (2013.01)
USPC ......................................... 73/146.5; 340/445

(58) Field of Classification Search
USPC ................................................ 73/146–146.8
See application file for complete search history.

(56) References Cited

U.S. PATENT DOCUMENTS

| 5,952,568 A | 9/1999 | Bedell, Jr. |
| 2006/0028331 A1* | 2/2006 | Ito et al. .......................... 340/445 |

(Continued)

FOREIGN PATENT DOCUMENTS

| JP | 2003-159919 A | 6/2003 |
| JP | 2006-069389 A | 3/2006 |

(Continued)

OTHER PUBLICATIONS

International Search Report of corresponding International Application No. PCT/JP2012/000234, dated on Apr. 24, 2012.

(Continued)

*Primary Examiner* — Andre Allen
(74) *Attorney, Agent, or Firm* — Global IP Counselors, LLP

(57) ABSTRACT

A transmission device of a tire condition monitoring system comprises a sensor which detects, as tire information, the condition of gas filled into a tire cavity region, a transmitter which transmits the detected tire information by radio, and a housing which covers the sensor and the transmitter. A surface of the housing defines an opening that connects an internal space within the housing and the tire cavity region. The opening extends on the surface of the housing while forming the shape of a straight line, a curved line, or a combination of a straight line and a curved line. The maximum value of the opening width orthogonal to the direction in which the opening extends is 0.8 mm or less. Even if a flat tire is fixed using a puncture sealant, tire information such as tire pressure information can be appropriately measured and acquired by this transmission device.

20 Claims, 8 Drawing Sheets

(56) References Cited

U.S. PATENT DOCUMENTS

| | | |
|---|---|---|
| 2006/0185429 A1 | 8/2006 | Liu et al. |
| 2012/0222478 A1* | 9/2012 | Kanenari et al. ............. 73/146.5 |
| 2012/0229266 A1* | 9/2012 | Kanenari ...................... 340/445 |
| 2012/0234086 A1* | 9/2012 | Kanenari ........................ 73/146 |
| 2012/0235808 A1* | 9/2012 | Kanenari et al. ............. 340/445 |

FOREIGN PATENT DOCUMENTS

| | | |
|---|---|---|
| JP | 2007-196834 A | 8/2007 |
| JP | 2008-062730 A | 3/2008 |
| JP | 2008-302805 A | 12/2008 |
| JP | 2008-302806 A | 12/2008 |
| JP | 2011-005986 A | 1/2011 |
| JP | 2011-005999 A | 1/2011 |

OTHER PUBLICATIONS

Japanese Office Action of the corresponding Japanese Patent Application No. 2011-008054, dated Apr. 19, 2012.

Japanese Office Action of the corresponding Japanese Patent Application No. 2011-008054, dated Dec. 20, 2012.

* cited by examiner

TRANSMISSION DEVICE FOR TRANSMITTING INFORMATION RELATING TO CONDITION OF TIRE, TIRE ASSEMBLY, AND TIRE CONDITION MONITORING SYSTEM

CROSS-REFERENCE TO RELATED APPLICATIONS

This U.S. National stage application claims priority under 35 U.S.C. §119(a) to Japanese Patent Application No. 2011-008054, filed in Japan on Jan. 18, 2011, the entire contents of Japanese Patent Application No. 2011-008054 are hereby incorporated herein by reference.

BACKGROUND

1. Field Of The Invention

The present invention relates to a transmission device provided in a tire cavity region for transmitting tire information related to the condition of the tire, a tire assembly, and a tire condition monitoring system for determining the presence of an abnormality in a tire.

2. Description Of The Related Art

Inspections of the air pressure of tires mounted on a vehicle have conventionally been desired from the point of view of improvements in tire durability, abrasion resistance and fuel consumption, or improvement in ride comfort and maneuverability. As a result, various types of tire pressure monitoring systems have been proposed. These systems generally include a transmission device that detects air pressure information of the tires mounted on a vehicle and transmits that information, and the systems obtain the air pressure information of the tires from the transmission device and monitor the air pressure of the tires.

Conversely, a puncture repair agent to be injected inside the tire cavity region interposed between the tire and the rim is often used when a puncture occurs in a tire. Since the puncture repair agent is a liquid, the puncture repair agent adheres to the inner surface of the tire that faces the tire cavity region and even adheres to the transmission device provided in the tire cavity region when the puncture repair agent is injected into the tire cavity region. In some cases, the puncture repair agent solidifies and covers an opening provided in the transmission device thus becoming a problem that adversely affects the measurement of the air pressure.

To address this problem, a wheel condition detection device has been proposed that is capable of retaining a normal detection condition by preventing the intrusion of foreign matter from a communicating part for detection as described in Japanese Patent Laid-open No. 2008-62730.

Specifically, a communicating part open and close mechanism that opens and closes a air inlet hole provided in a case is provided on a tire pressure monitoring system (TPMS) valve of the wheel condition detection device. The puncture repair agent is restricted from intruding into a detection space through the air inlet hole when a puncture is being repaired. The communicating part open and close mechanism is configured by a mechanical mechanism that includes a cover and a helical torsion spring, and the air inlet hole is automatically opened and closed due to the centrifugal force acting on the wheel.

Moreover, a tire pressure monitoring system and a tire pressure sensor unit have been proposed that are capable of informing a driver about the possibility that the tire pressure is low after the use of a puncture repair agent when repairing a puncture as described in Japanese Patent Laid-open No. 2007-196834.

Specifically, the tire pressure monitoring system is equipped with a sensor unit provided in each tire of a vehicle and having and air pressure sensor and a transmitter, a receiver for receiving radio waves from the sensor units, and a control ECU for issuing an alarm when the pressure of a tire meets or falls below a threshold. The system includes a puncture determining means for determining the presence of a puncture in each tire and a puncture repair agent usage determining means for determining whether a puncture repair agent is used when repairing a puncture, and the control ECU continues to issue the alarm even if the tire pressure value from the pressure sensor is a normal value when it is determined that a punctured tire was repaired using the puncture repair agent.

SUMMARY

The air inlet hole open and close mechanism in the device described in Japanese Patent Laid-open No. 2008-62730 is configured by a mechanical function including a cover and a helical torsion spring thus making the device complicated and leading to the problem of high costs.

It is not known whether the tire air pressure information measured after repairing the tire using puncture repair agent is correct or not in the system and unit described in Japanese Patent Laid-open No. 2007-196834. As a result, the above system and unit are not able to determine the presence of an abnormality in the tire after a puncture repair.

Accordingly, an object of the present invention is to provide a tire condition monitoring system that determines the presence or absence of an abnormality, a tire assembly, and a transmission device that is able to keep properly detecting and transmitting tire information such as tire air pressure information and the like even if a puncture of the tire has been repaired using a puncture repair agent, according to a new method different from the above conventional techniques.

One aspect of the present invention is a transmission device provided in a tire cavity region for transmitting tire information related to the condition of the tire.

The device includes a sensor that detects the condition of a gas filled in a tire cavity region encompassed by the tire and a rim, as tire information;

a transmitter that transmits by radio the detected tire information; and a housing that covers the sensor and the transmitter.

An opening that connects an internal space within the housing and the tire cavity region is provided in the surface of the housing, and the opening is provided so as to extend on the surface of the housing while forming the shape of a straight line, a curved line, or a combination of a straight line and a curved line, and a maximum value of an opening width of orthogonal to the extending direction of the opening is not more than 0.8 mm.

The opening preferably includes a portion, on either side in the extending direction, having an opening width that becomes narrower as the opening proceeds to either side in the extending direction.

When the opening has a linear outside opening edge of a air inlet hole that penetrates the housing and an opening edge of the air inlet hole that faces the internal space of the air inlet hole is referred to as an inside opening edge, the opening width of the inside opening edge is preferably wider than the outside opening edge.

A projecting part that projects into the tire cavity region is provided in the outer surface of the housing, and the opening preferably crosses a slanted part or a top part of the projecting part.

A projecting part that projects into the tire cavity region is provided on the outer surface of the housing, and the opening crosses a top part of the projecting part, and the opening is preferably provided so that the direction of a line that connects both end parts of the opening is within a range of ±30 degrees with respect to the tire width direction of a mounted tire. Moreover, the outer surfaces of the top part and the slanted part of the projecting part are preferably treated with a water repelling treatment.

The ratio of the length of the opening in the extending direction is preferably three or more times the maximum opening width value of the opening. The ratio is more preferably five times or more.

Another aspect of the present invention is a tire assembly having a tire mounted on a rim and the transmission device, the tire assembly characterized in that the projecting part of the transmission device is provided in the outer surface of the housing so as to face toward the outside in the tire radial direction.

Still another aspect of the present invention is a tire condition monitoring system.

The system includes:
a transmission device, a reception device, and a monitoring part, wherein
the transmission device includes
a sensor that detects the condition of a gas filled in a tire cavity region encompassed by the tire and a rim, as tire information;
a transmitter that transmits by radio the detected tire information, and
a housing that covers the sensor and the transmitter.

An opening that connects an internal space within the housing and the tire cavity region is provided in the surface of the housing, and the opening is provided so as to extend on the surface of the housing while forming the shape of a straight line, a curved line, or a combination of a straight line and a curved line, and a maximum value of an opening width of orthogonal to the extending direction of the opening is not more than 0.8 mm.

The reception device receives the tire information transmitted by the transmitter.

The monitoring part determines the presence or absence of an abnormality of the tire on the basis of the tire information, and reports the determination results.

The aforementioned transmission device, tire assembly, and tire condition monitoring system are able to appropriately measure and acquire tire information such as tire pressure information even if a punctured tire is fixed using a puncture repair agent.

DESCRIPTION OF EMBODIMENTS

The following describes a transmission device, a tire assembly, and a tire condition monitoring system of the present invention.

Figure 1:
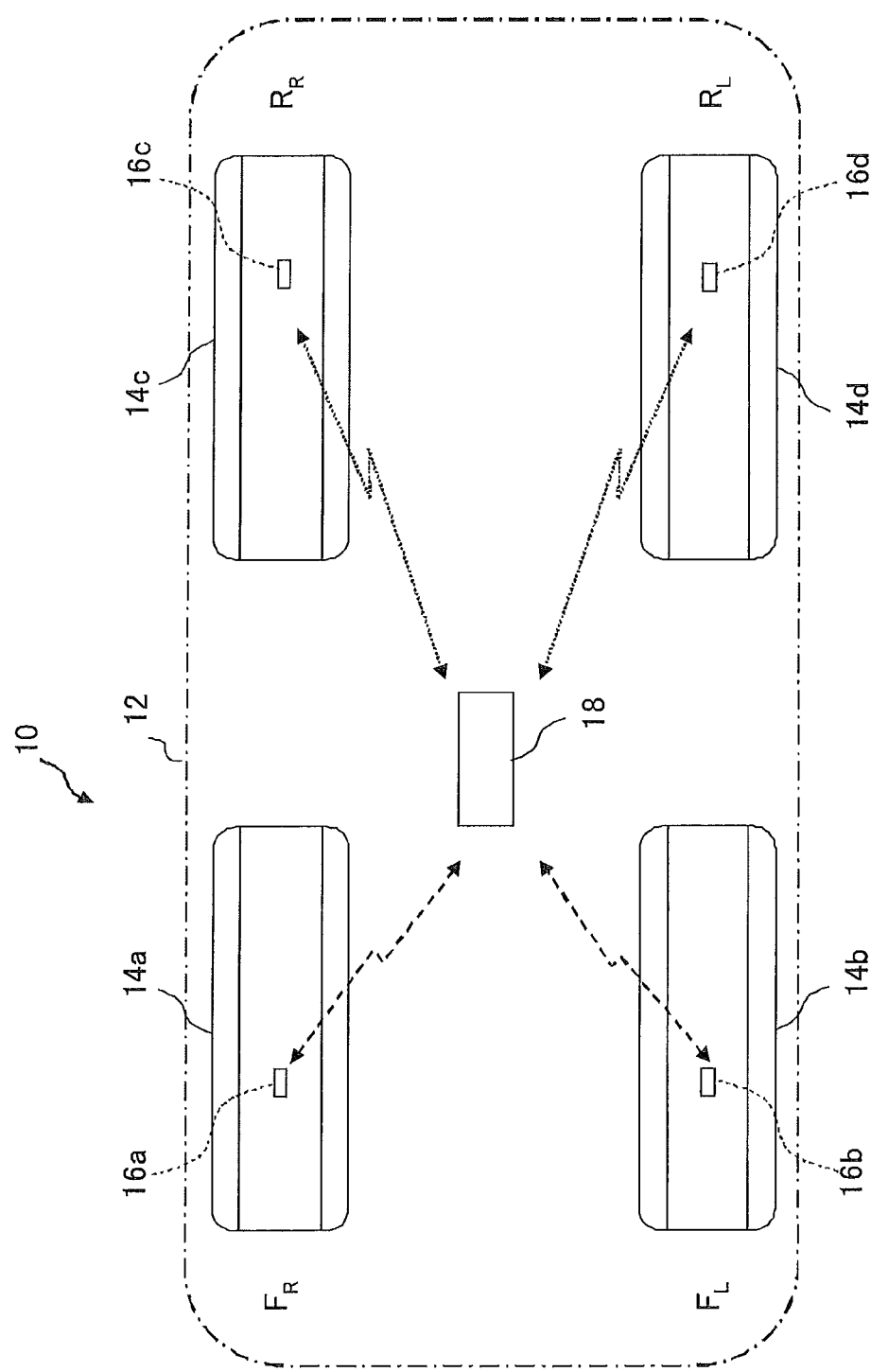
FIG. 1 is an overview of a tire pressure monitoring system that is a first embodiment of a tire condition monitoring system.

FIG. 1 is an overview of a tire pressure monitoring system 10 that is a first embodiment of a tire condition monitoring system.

(Outline of Tire Pressure Monitoring System)

The tire pressure monitoring system 10 (referred to as "system" below) is mounted on a vehicle 12. The system 10 has air pressure information transmitting devices (referred to as "transmitting device" below) 16a, 16b, 16c, and 16d respectively provided in tire cavity regions of tires 14a, 14b, 14c, and 14d on wheels of the vehicle 12, and a monitoring device 18.

The transmitting devices 16a, 16b, 16c, and 16d detect information related to the air pressure filled in each of the tire cavity regions enclosed by the tire and the rim, as tire information, and transmits the tire information to the monitoring device 18. Hereinbelow, the transmitting devices 16a, 16b, 16c, and 16d will be collectively referred to as the transmitting device 16 when describing the transmitting devices 16a, 16b, 16c, and 16d together.

(Configuration of Transmitting Devices)

Figure 2:
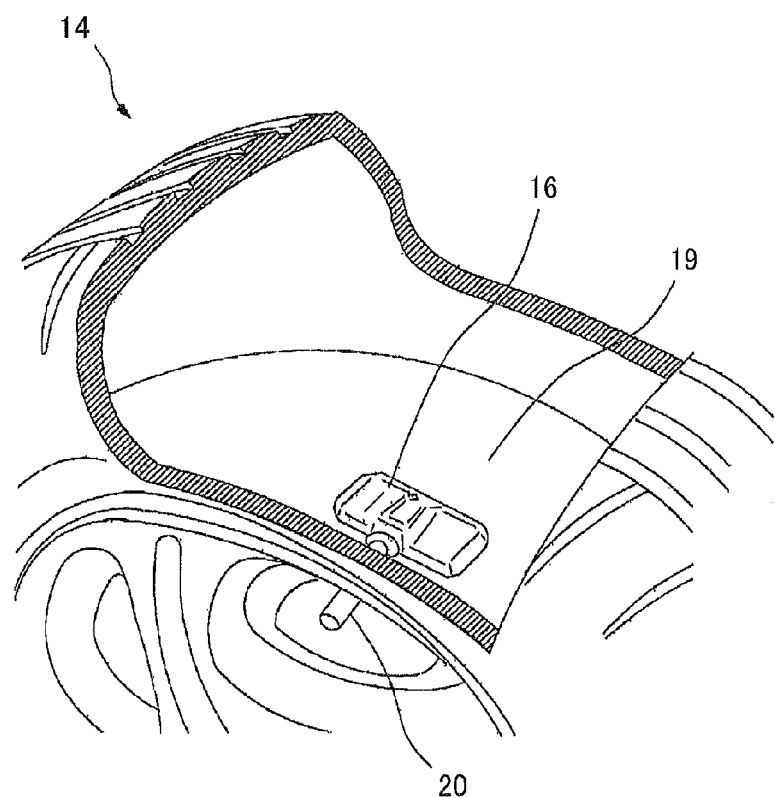
FIG. 2 describes an example of a method for fixing a transmitting device illustrated in FIG. 1 inside a tire cavity region.
Figure 3:
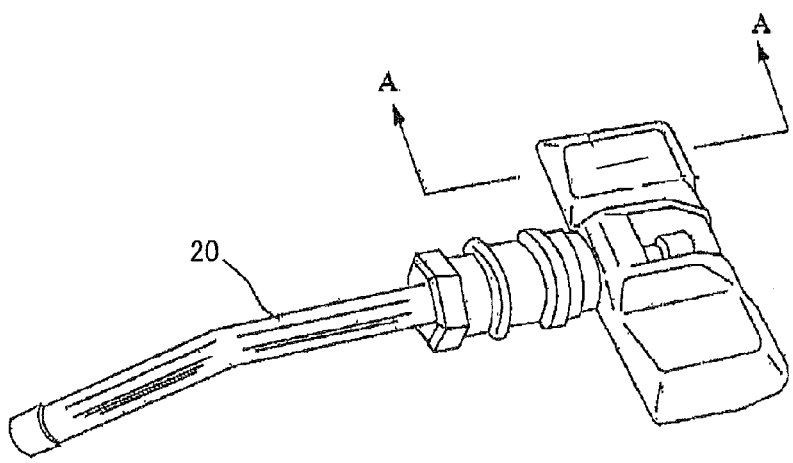
FIG. 3 is a perspective view of an entire device made by the integration of the transmitting device illustrated in FIG. 2 with a tire valve.

FIG. 2 is an exploded perspective view of a tire assembly to describe an example of a method for fixing the transmitting device 16 that configures the tire assembly inside a tire cavity region. FIG. 3 is a perspective view of an entire device made by the integration of the transmitting device 16 illustrated in FIG. 2 with a tire valve 20.

The tire assembly has the tire 14, the transmitting device 16, a rim 19, and the valve 20. The tire 14 is mounted in an integrated manner with the rim 19, and the transmitting device 16 is fixed inside the tire cavity region through the valve 20. Specifically, the transmitting device 16 is provided at an end part of the tire valve 20 that extends toward the tire cavity region and is fixedly disposed inside the tire cavity region by the tire valve 20 being mechanically fixed to the rim 19.

Figure 4A:
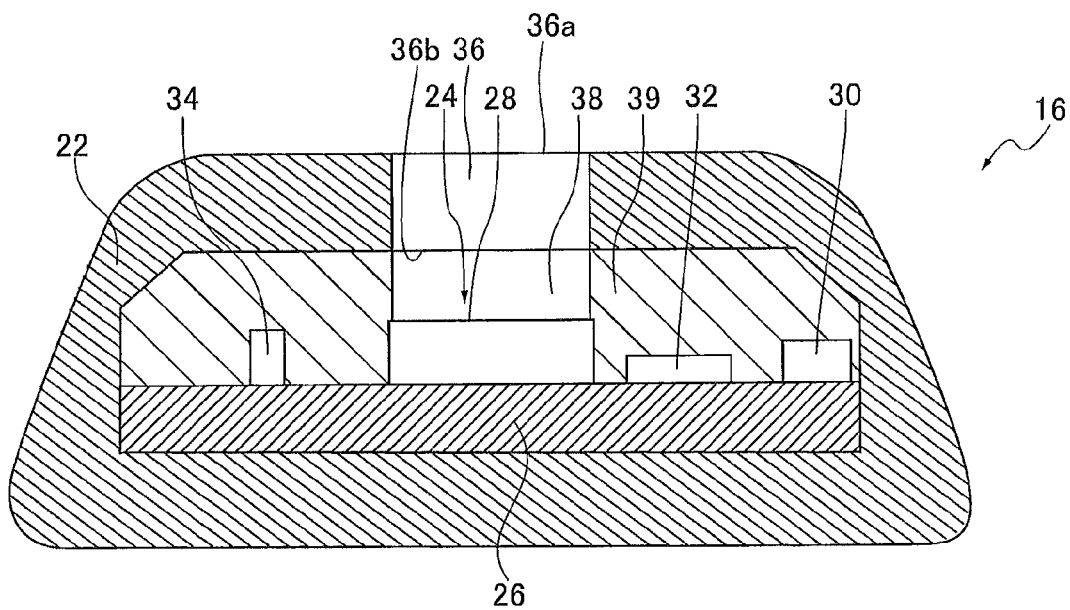
FIG. 4A is an arrow cross-section view of the transmitting device along line A-A illustrated in FIG. 3.

FIG. 4A is an arrow cross-section view of the transmitting device 16 along line A-A illustrated in FIG. 3. As illustrated in FIG. 4A, the transmitting device 16 has a housing 22 and a circuit 24 provided inside the housing 22. The circuit 24 has a base plate 26, a sensor unit 28 provided on the base plate 26, a transmitter 30, a processing unit 32, a power supply unit 34, and an antenna 40 (see FIG. 5). An internal space enclosed by the housing 22 is filled with a sealing resin 39 to leave a sensor space 38, and the circuit 24 is fixed inside the housing 22 by the sealing resin 39.

Figure 5:
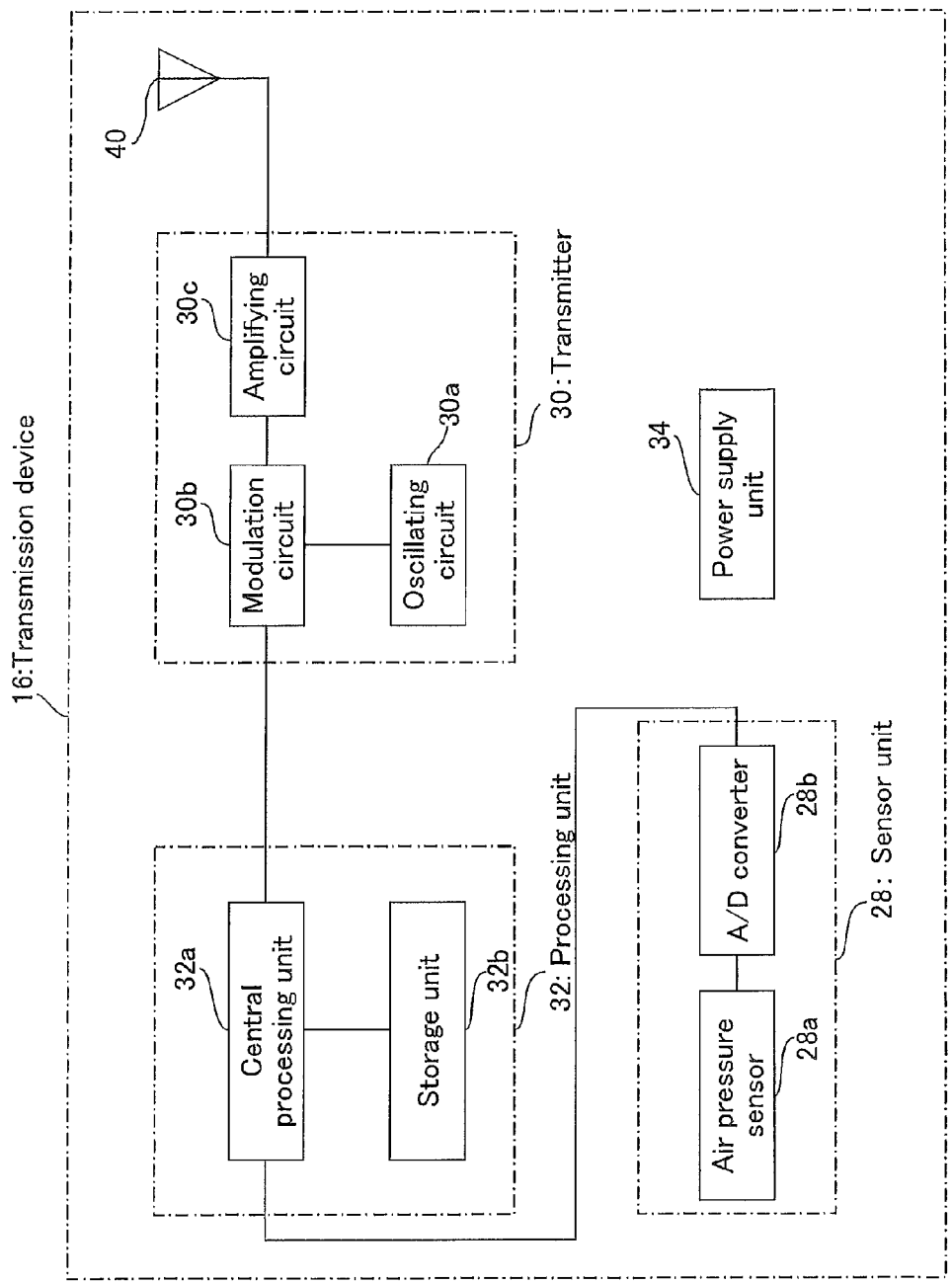
FIG. 5 illustrates a circuitry of the transmitting device illustrated in FIG. 1.

FIG. 5 illustrates a circuitry of the transmitting device 16.

The sensor unit 28 has an air pressure sensor 28a and an A/D converter 28b. The air pressure sensor 28a senses air pressure in the sensor space 38 inside the housing 22 and outputs a pressure signal. The sensor space 38 inside the housing 22 is linked to the space of the tire cavity region through a air inlet hole 36 that penetrates the housing 22.

The A/D converter 28b digitally-converts the pressure signal outputted by the air pressure sensor 28a and outputs pressure data.

The processing unit 32 has a central processing unit 32a and a storage unit 32b. The central processing unit 32a operates according to a program stored in a semiconductor memory of the storage unit 32b. The central processing unit 32a performs controls so that the pressure data, which is air pressure information and is sent from the sensor unit 28, is transmitted to the monitoring device 18 through the transmitter 30 at certain intervals, for example every five minutes, when the central processing unit 32a operates based on the supply of electrical power. Identification information unique to each transmitting device 16 is previously stored in the storage unit 32b, and the central processing unit 32a performs controls so that the pressure data is transmitted to the monitoring device 18 along with the identification information.

The storage unit 32b is equipped with a ROM for storing a program for operating the central processing unit 32a, and a rewritable non-volatile memory such as an EEPROM. The identification information unique to the transmitting device 16 is stored in a non-rewritable region of the storage unit 32b.

The transmitter 30 has an oscillating circuit 30a, a modulation circuit 30b, and an amplifying circuit 30c.

The oscillating circuit 30a generates a carrier wave signal such as a RF signal of a 315 MHz frequency band.

The modulation circuit 30b uses the pressure data sent from the central processing unit 32a and the identification information unique to the transmitting device 16 to modulate the carrier wave signals and generate a transmission signal. A system such as amplitude-shift keying (ASK), frequency modulation (FM), phase modulation (PM), or phase-shift keying (PSK) may be used for the modulation system.

The amplifying circuit 30c amplifies the transmission signal generated by the modulation circuit 30b and transmits the transmission signal by radio through the antenna 40 to the monitoring device 18.

The power supply unit 34 uses a secondary battery for example to provide electrical power in a substantially semi-permanent manner to the sensor unit 28, the transmitter 30, and the processing unit 32.

Figure 4B:
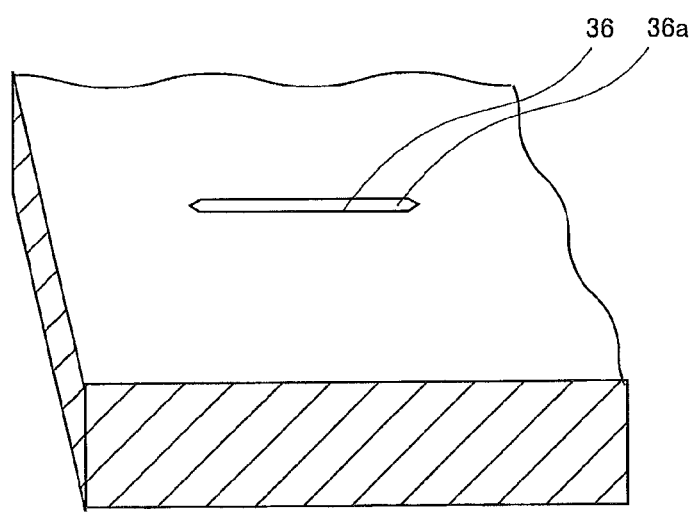
FIG. 4B is an enlargement of an opening provided in a housing of the transmitting device.

As illustrated in FIGS. 4A and 4B, an opening part 36a that connects the tire cavity region and the sensor space 38 that is the internal space in the housing 22 is provided in the outer surface of the housing 22 that covers the circuit 24. The opening part 36a is an outside opening edge of the air inlet hole 36 and faces the tire cavity region.

The opening part 36a is provided in the outer surface of the housing 22 to form a straight line and extend in one direction. A maximum value of the opening width orthogonal to the direction in which the opening part 36a extends in the straight line is 0.8 mm or less. As illustrated in FIG. 4B, preferably both ends of the opening part 36a in the extending direction thereof have portions in which the opening width narrows as the opening part 36a proceeds in the extending direction toward the ends from the point of view of mechanical strength and moldability of the housing resin.

The air inlet hole 36 and the opening part 36a are described below.

While the transmitting device 16 of the present embodiment detects the air pressure filled inside the tire cavity region as a condition of the tire, the condition of the tire to be detected may be the temperature of the air inside the tire cavity region instead of the air pressure.

The transmitting device 16 may be fixed to the tire inner surface that faces the tire cavity region, or may be fixed directly to the outer surface of the rim 19 that faces the tire cavity region instead of being fixed to the tire valve 20.

(Monitoring Device Configuration)

Figure 6:
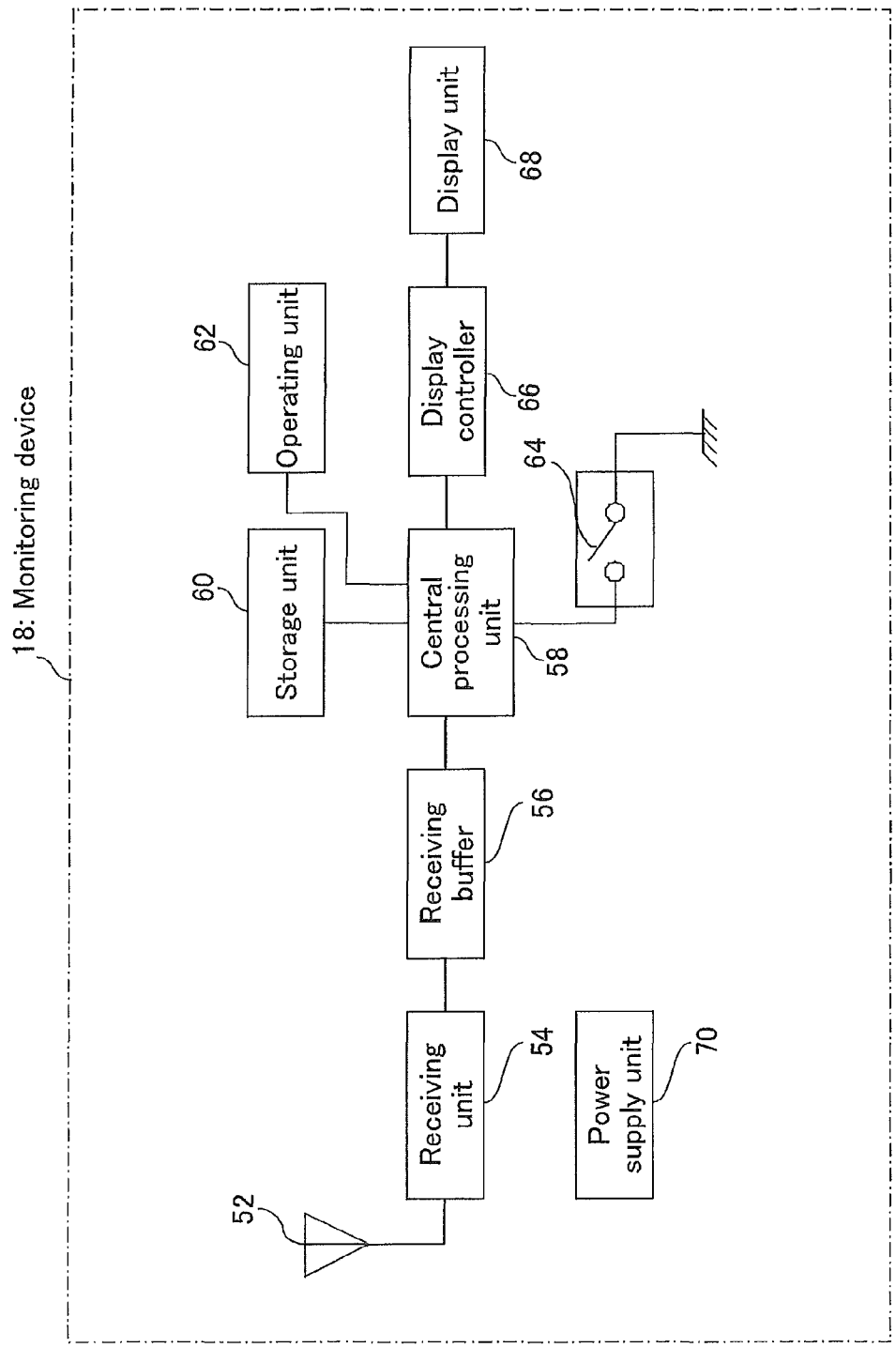
FIG. 6 illustrates a circuitry of the monitoring device illustrated in FIG. 1.

FIG. 6 is a circuitry diagram of the monitoring device 18.

The monitoring device 18 is disposed, for example, at the location of the driver's seat in the vehicle 10 and reports air pressure information to the driver. The monitoring device 18 has an antenna 52, a receiving unit 54, a receiving buffer 56, a central processing unit 58, a storage unit 60, an operating unit 62, a switch 64, a display controller 66, a display unit 68, and a power supply unit 70.

The antenna 52 conforms to the same frequency as the transmitting frequency of the transmitting device 16, and is connected to the receiving unit 54.

The receiving unit 54 is a receiving device that receives the transmission signal at a certain frequency transmitted by the transmitting device 16, conducts demodulation, and extracts data including the pressure data and the identification information. The data is outputted to the receiving buffer 56.

The receiving buffer 56 temporarily stores the data including the pressure data and the identification information outputted from the receiving unit 54. The stored data including the pressure data and the identification information is outputted to the central processing unit 58 according to an instruction from the central processing unit 58.

The central processing unit 58 is mainly configured as a CPU and operates on the basis of a program stored in the storage unit 60. The central processing unit 58 is a monitoring unit that monitors the air pressure of the tires 14a to 14d according to the identification information on the basis of the received data that includes the pressure data and the identification information. Specifically, the central processing unit 58 determines the presence or absence of an abnormality of the tire on the basis of the pressure data, and reports the determination results. Determining the presence or absence of a tire abnormality signifies the determination that the air pressure is, for example, abnormally low or has dropped dramatically in a short time.

The central processing unit 58 outputs the determination result to the display controller 66 and the determination result is outputted to the display unit 68 via the display controller 66.

Furthermore, the central processing unit 58 conducts initialization of the communication protocol and the like with the transmitting device 16 in accordance with information from the operating unit 62 or information from the switch 64. The setting of a determination condition for determining the presence or absence of a tire abnormality by the central processing unit 58 may be conducted based on information from the operating unit 62.

The storage unit 60 has a ROM in which is stored a program for operating the CPU of the central processing unit 58, and a non-volatile memory such as an EEPROM. A, table of communication protocols with the transmitting device 16 is stored during the production process in the storage unit 60. The transmitting device 16 and the monitoring device 18 communicate in the initial, stage with the above communication protocols. Information such as communication protocols, transfer bit rates, data formats and the like is included in correspondence with the unique identification information of the transmitting device 16 in the communication protocol table. The information can be freely reset with an input from the operating unit 62.

The operating unit 62 includes an input device such as a keyboard, and is used for inputting various types of information and conditions. The switch 64 is used for instructing the central processing unit 58 to start initialization.

The display controller 66 controls the display unit 68 to display tire air pressure associated with the mounting position of the tire, in accordance with the determination result from the central processing unit 58. The display controller 66 controls the display unit 68 to display the determination result that indicates the tire puncture condition at the same time.

The power supply unit 70 supplies electrical power by controlling the electrical power supplied from a battery mounted in the vehicle 10 to a voltage suitable for each unit of the monitoring device 18.

The transmitting device 16 and the monitoring device 18 are configured in this way.

(Air Inlet Hole and Opening Part of Transmitting Device)

The opening part 36*a* that forms a straight line and that extends in one direction is provided in the cuter surface of the housing 22 of the transmitting device 16. The air inlet hole 36 and the opening part 36*a* are described in detail below.

Figure 7:
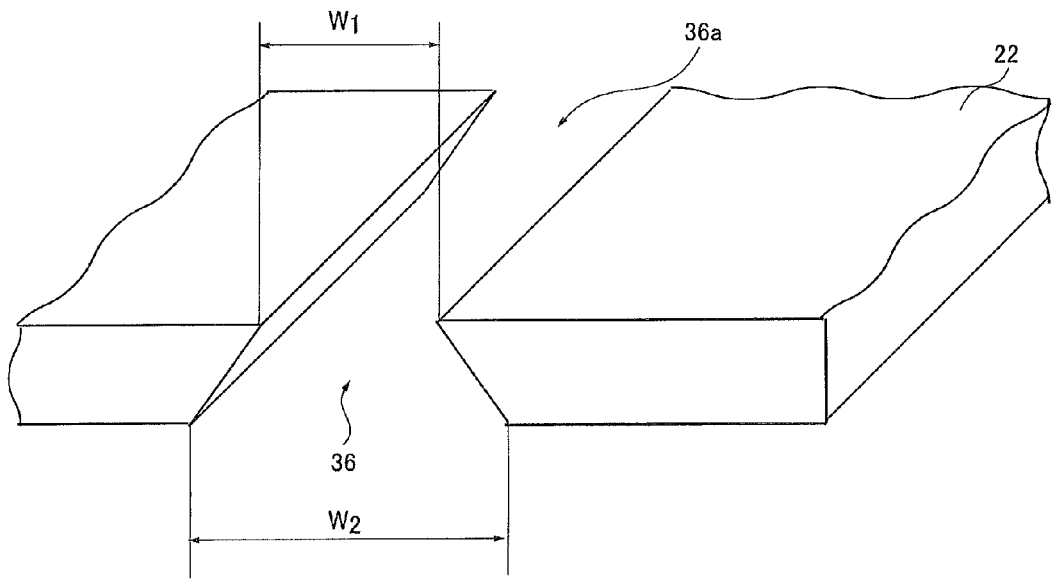
FIG. 7 describes an example of a shape of a air inlet hole of the present embodiment.

FIG. 7 illustrates a cross-sectional shape of the air inlet hole 36. The opening part 36*a* is an outside opening edge of the air inlet hole 36 that penetrates the housing 22 as illustrated in FIG. 7. When the opening edge of the air inlet hole 36 facing the sensor space 38 of the air inlet hole 36 is referred to as an inside opening edge, an opening width $W_2$ of the inside opening edge is wider than an opening width $W_1$ of the outside opening edge. Consequently, since the opening width $W_2$ of the inside opening edge is wider than the opening width $W_1$, capillary action is inhibited and the intrusion of the puncture repair agent applied onto or near the opening part 36*a* into the air inlet hole 36 is suppressed. The opening width $W_2$ is preferably wider than the opening width $W_1$, preferably at least two times the opening width $W_1$, and more preferably four times.

In the present embodiment, even if the opening part 36*a* extends in a straight line, the intrusion of puncture repair agent into the air inlet hole 36 and further into the sensor space 38 can be suppressed since the maximum value of the opening width $W_1$ is 0.8 mm or less. In the unlikely event that the puncture repair agent does intrude into the air inlet hole 36 and solidify, another portion of the opening part 36*a* can maintain the link between the sensor space 38 and the tire cavity region since the opening part 36*a* extends in a straight line. Therefore, even if a punctured tire is fixed using the puncture repair agent, tire information such as tire pressure information can be appropriately measured and acquired. While a lower limit of the maximum value of the opening width $W_1$ is not limited in particular so long as the tire cavity region and the sensor space 38 are linked and have the same air pressure, the lower limit of the maximum value of the opening width $W_1$ is 0.1 mm for example.

A ratio of the length in the extending direction of the opening part 36*a* with respect to the maximum value of the opening width of the opening part 36*a* is preferably three or more considering the suppression of the intrusion of the puncture repair agent into the air inlet hole 36. The ratio is more preferably five times or more. The upper limit of the ratio is not limited in particular, but a practical upper limit of the ratio is 100. The outer surface around the opening part 36*a* is preferably treated with a water repelling treatment. The puncture repair agent has difficulty adhering due to the water repelling treatment. A silicon-based resin, a fluorine-based resin, or a modified resin in which an organic silyl group or a fluoroalkyl group is grafted may be used as a surface material in the water repelling treatment. Moreover, a pattern of minute unevenness may be applied to exhibit a water-repellent capability.

Figure 8A:
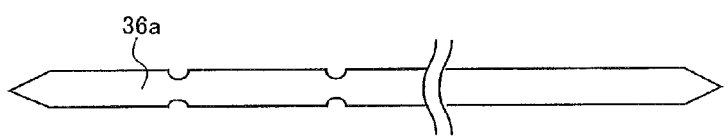
FIGS. 8A and 8B describe other examples of openings of the present embodiment.
Figure 8B:

FIGS. 8A and 8B describe other examples of openings of the present embodiment. FIG. 8A is an example of a linear opening part 36*a*. While the opening part 36*a* extends in a linear manner in one direction, the opening width becomes partially narrow. Even if such a linear opening part 36*a* is used, the intrusion of puncture repair agent into the air inlet hole 36 and further into the sensor space 38 can be suppressed even if the puncture repair agent adheres onto or near the opening part 36*a*. In the unlikely event that the puncture repair agent does intrude into the air inlet hole 36 and solidify, since the opening part 36*a* extends in a straight line, another spot of the opening part 36*a* can maintain the link between the sensor space 38 and the tire cavity region.

FIG. 8B is another example of the opening part 36*a*. The opening part 36*a* illustrated in FIG. 8B forms a zigzag shape instead of the linear opening that extends in one direction. Even with the opening part 36*a* having such a shape, the intrusion of puncture repair agent into the air inlet hole 36 and further into the sensor space 38 can be suppressed even if the puncture repair agent adheres onto or near the opening part 36*a*. In the unlikely event that the puncture repair agent does intrude into the air inlet hole 36 and solidify, since the opening part 36*a* extends in a line, another portion of the opening part 36*a* can maintain the link between the sensor space 38 and the tire cavity region.

The opening part 36*a* may have a spiral shape in addition to the shapes illustrated in FIGS. 8A and 8B. The opening part 36*a* may at least be a straight line, or have a curved shape such as a circle, an oval, or a parabola, or may have a shape combined from a curved shape and a linear shape. Furthermore, the opening part 36*a* may extend in a linear manner, but the line may be branched.

Figure 9A:
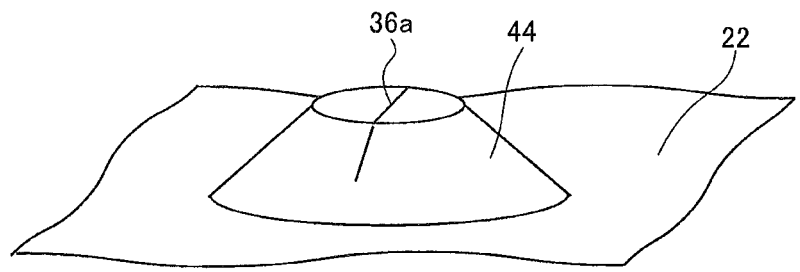
FIGS. 9A-C describe other examples of projecting parts and openings.
Figure 9B:
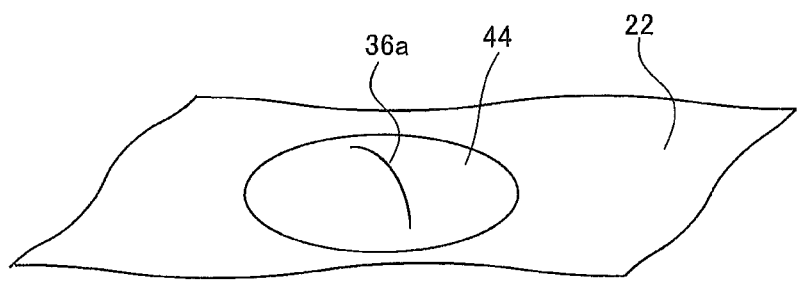
Figure 9C:
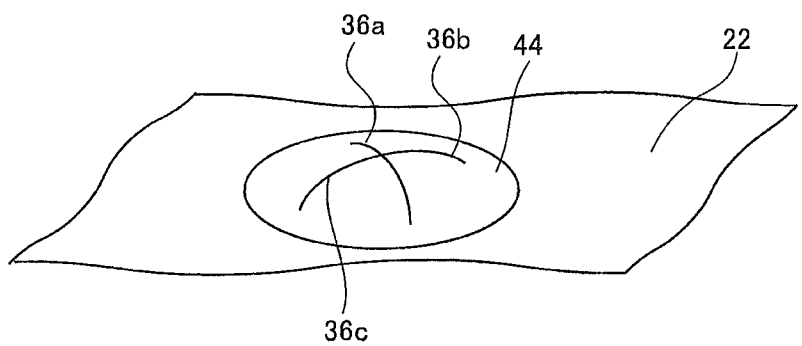

FIGS. 9A to 9C are other examples of the opening part 36*a*. In the example in FIG. 9A, a truncated cone-shaped projecting part 44 that projects toward the tire cavity region is provided on the outer surface of the housing 22, and the opening part 36*a* passes through the top part of the projecting, part 44. The projecting part 44 is preferably provided on the outer surface of the housing 22 to project toward the outer side (side further away from the tire rotational axis) of the tire radial direction of the tire to be mounted. The likelihood of drops of the puncture repair agent adhering to the top part of the projecting part 44 is reduced since the projecting part 44 faces toward the outer side of the tire radial direction. As a result, the possibility is reduced that the puncture repair agent will adhere to the entire opening part 36*a* that extends in a linear manner in the top part of the projecting part 44, and the link between the sensor space 38 and the tire cavity region can be more securely, maintained.

The outer surfaces of a slanted part and the top part of the projecting part 44 are preferably treated with the water repelling treatment. In addition to the outer surfaces of the slanted part and the top part of the projecting part 44 being treated with the water repelling treatment, in the unlikely event that the puncture repair agent adheres to the outer surfaces, the puncture repair agent would be easily scattered to the outside in the tire radial direction due to the centrifugal force of the rotation of the tire.

For example, a silicon-based resin, a fluorine-based resin, or a modified resin in which an organic silyl group or a fluoroalkyl group is grafted may be used as a surface material in the water repelling treatment. Moreover, a pattern of minute unevenness may be applied to achieve the water-repellent capability.

In the example illustrated in FIG. 9B, a projecting part 44 with a smooth spherical shape is used in place of the truncated cone shape of the projecting part 44 on FIG. 9A. The opening part 36a that extends in a linear manner is provided on the top part of the projecting part 44. Since the opening part 36a is provided so as to cross the top part in the example illustrated in FIG. 9B, the same effects as the projecting part 44 in FIG. 9A are achieved.

As illustrated in FIG. 9C, the opening part 36a may be configured to branch into opening parts 36c and 36d instead of the example illustrated in FIG. 9B. In the example illustrated in FIG. 9C, the opening part 36a is provided to cross the top part of the projecting part 44, and the opening part 36a in the top part branches into the openings 36b and 36c. While the location where the opening parts branch may not be in the top part of the projecting part 44, the opening parts preferably branch in the top part of the projecting part 44 from a point of view of reducing possibility that drops of the puncture repair agent will adhere to the opening part 36a.

Figure 10A:
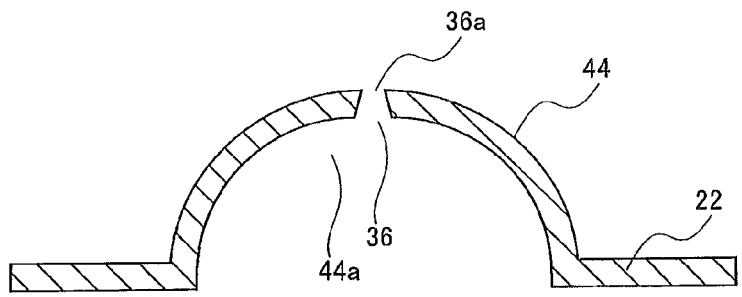
FIGS. 10A and B describe examples of cross-sections of the air inlet hole of the present embodiment.
Figure 10B:
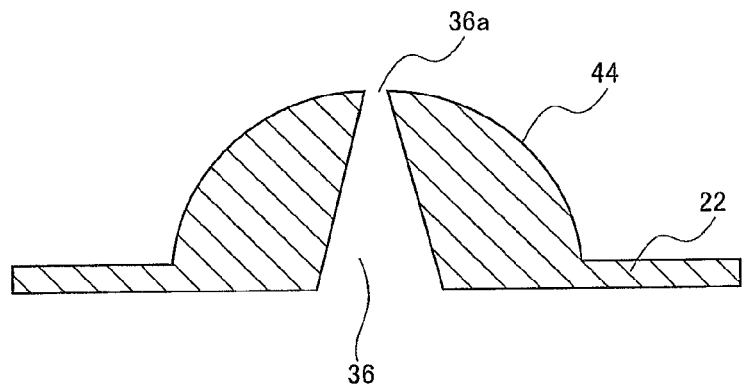

FIGS. 10A and 10B illustrate examples of cross-sectional shapes of the air inlet hole 36 and the projecting part 44. The projecting part 44 is formed to project so that the housing 22 rises in the direction of the tire cavity region, and the air inlet hole 36 extends to the inside of the projecting part 44 to join an internal space 44a that is integrated with the sensor space. Alternatively, as illustrated in FIG. 10B, the projecting part 44 is provided to project from the outer surface of the housing 22, and the air inlet hole 36 is provided so as to penetrate the projecting part 44 and the housing 22. In all of the above examples, the opening width at the inside opening edge is preferably wider than the opening width at the outside opening edge of the air inlet hole 36.

Figure 11:
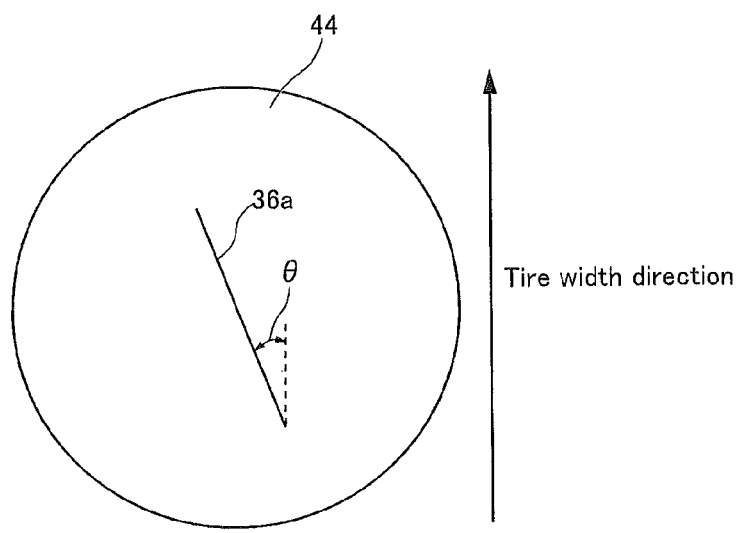
FIG. 11 describes an orientation of the opening of the present embodiment.

FIG. 11 is still another example of a disposition of the air inlet hole 36, and is a view of the opening part 36a of the air inlet hole 36 as seen from above. The projecting part 44 that projects into the tire cavity region is provided on the outer surface of the housing 22. The opening part 36a of the air inlet hole 36 passes through the top part of the projecting part 44, and the opening part 36a is provided so that the direction of the line that connects both of the end parts of the opening part 36a is within a range of ±30 degrees with respect to the tire width direction of the mounted tire. Specifically, an angle θ of the line that connects both end parts of the opening part 36a with respect to the tire width direction is preferably −30 degrees to +30 degrees. The reason for determining the orientation of the line that connects both end parts of the opening part 36a in this way is to reduce the risk of damage to the housing 22 due to the strength of the projecting part 44 being reduced because of the cutting of the top part of the projecting part 44 due to the air inlet hole 36. Specifically, when the tire is mounted on the rim, the bead portion of the tire faces the tire width direction and transverses the housing 22 of the transmitting device 16 and the bead portion may come into contact with the outer surface of the housing 22. In this case, the bead portion of the tire to be mounted may come into contact with the projecting part 44 made weaker due to the provision of the air inlet hole 36 and may damage the projecting part 44 and the housing 22. However, in this case, since the localized reductioh in strength along the tire width direction can be suppressed due to the above angle θ being −30 to +30 degrees, the possibility of damage due to contact with the bead portion can be reduced.

While the opening part 36a in the example illustrated in FIG. 11 is a shape that extends in a straight line, the opening part 36a may be a curved line or a combination of a curved line and a straight line.

Effects of the transmitting device 16 of the present embodiment were examined as described below.

The transmitting device 16 was provided inside the tire cavity region of a 195/65R15 tire and puncture repair agent was injected into the tire cavity region. The air pressure of the tire 14 was 200 kPa. A driving test of 30 km/h was conducted on the tire 14 using an indoor drum test. Driving steps of driving for 30 minutes were conducted. When the driving was stopped after each driving step, the air pressure was reduced by 50 kPa and the air pressure of the tire 14 was measured. The air pressure was obtained using the monitoring device 18. When a correct tire pressure was detected, namely, when the pressure data indicated a reduction of 50 kPa, the air pressure was returned to the original pressure by increasing the air pressure by 50 kPa, and the driving was restarted and this cycle was repeated. The Lire driving test examined the tire driving time until a correct air pressure measurement could not be achieved. The upper limit of the driving time was set to 48 hours and if correct air pressure measurements could be made during that time period, an evaluation was, made that the correct air pressure could be measured without problem during that time period even if the puncture repair agent was injected. Even if the testing time period did not reach 48 hours, the passing level was set at a driving time of ten hours or more.

Example 1, Comparative Examples 1 and 2, and Conventional Example

The driving time of tires was examined up until a correct air pressure measurement could not be made using examples 1 and 2 and comparative examples 1 and 2 each having a different opening width of the air inlet hole 36. The shape of the opening part 36a in the examples 1 and 2 and comparative examples 1 and 2 was a linear shape that extended in the tire width direction for a length of 5 mm. The opening part of the air inlet hole in the conventional example was circular with a diameter of 1.2 mm and an opening surface area of 1.19 mm$^2$. The tire driving time until a correct air pressure measurement could not be achieved was also examined for the conventional example. The opening widths of the opening part 36a that is the outside opening edge of the air inlet hole 36 and the inside opening edge of the air inlet hole 36 were the same.

TABLE 1

|  | Example 1 | Example 2 | Comparative example 1 | Comparative example 1 | Conventional example |
|---|---|---|---|---|---|
| Opening part 36a opening width W$_1$ (mm) | 0.6 | 0.8 | 1.0 | 1.2 | — |
| Driving time | 19 hours | 10 hours | 2 hours | 40 minutes | 60 minutes |

As indicated in Table 1, when the width of the opening part was 0.8 mm or less, the driving time reached the passing level and the correct air pressure could be measured.

Examples 1, 3, 4 and 5

The opening width W$_1$ of the opening part 36a (outside opening edge) of the air inlet hole 36 was set to 0.6 mm, and the opening width $W_2$ of the inside opening edge was changed to examine the relationship between the opening width $W_1$ of the outside opening edge and the opening width $W_2$ of the inside opening edge.

TABLE 2

|  | Example 1 | Example 3 | Example 4 | Example 5 |
|---|---|---|---|---|
| Inside opening edge opening width $W_2$ (mm) | 0.6 | 1.2 | 2.5 | 0.4 |
| Driving time | 19 hours | 26 hours | 48 hours | 11 hours |

As indicated in Table 2, it can be seen that the driving time is improved by widening the opening width $W_2$ of the inside opening edge in comparison to opening width $W_1$ of the opening part 36a that is the outside opening edge.

While the transmission device, the tire assembly, and the tire condition monitoring system of the present invention have been described in detail up to this point, the present invention is not limited to the above embodiments and it is apparent that a variety of changes and modifications can be made without departing from the scope of the present invention.

What is claimed is:

1. A transmission device provided in a tire cavity region for transmitting tire information related to a condition of a tire, the transmission device comprising:
   a sensor configured to detect a condition of gas filled in a tire cavity region encompassed by the tire and a rim, as tire information;
   a transmitter configured to wirelessly transmit the detected tire information; and
   a housing that covers the sensor and the transmitter, the housing including a surface that defines an opening that connects an internal space within the housing and the tire cavity region, the opening extending in an extending direction on the surface of the housing while forming a shape of a straight line, a curved line, or a combination of a straight line and a curved line, and a maximum value of an opening width orthogonal to the extending direction of the opening being not more than 0.8 mm.

2. The transmission device according to claim 1, wherein the opening includes a portion, on either side in the extending direction, having an opening width that becomes narrower as the opening proceeds toward either side in the extending direction.

3. The transmission device according to claim 1, wherein when the opening has a linear outside opening edge of an air inlet hole that penetrates the housing, and an inside opening edge of the air inlet hole faces an internal space of the air inlet hole, an opening width of the inside opening edge being wider than an opening width of the linear outside opening edge.

4. The transmission device according to claim 1, wherein the outer surface of the housing includes a projecting part that projects into the tire cavity region, and the opening crosses a slanted part or a top part of the projecting part.

5. The transmission device according to claim 1, wherein the outer surface of the housing includes a projecting part that projects into the tire cavity region, and the opening crosses a top part of the projecting part; and
   the opening is provided so that a direction of a line that connects both end parts of the opening is within a range of ±30 degrees with respect to a tire width direction of a mounted tire.

6. The transmission device according to claim 4, wherein outer surfaces of the top part and the slanted part of the projecting part are treated with a water repelling treatment.

7. The transmission device according to claim 1, wherein a ratio of a length of the opening in the extending direction is at least three times the maximum value of the opening width of the opening.

8. A tire assembly having the transmission device according to claim 4, and a tire mounted on a rim, wherein the projecting part of the transmission device is provided on the outer surface of the housing to face outside in a tire radial direction.

9. A tire condition monitoring system comprising:
   a transmission device, a reception device, and a monitoring part,
   the transmission device including
      a sensor configured, to detect a condition of gas filled in a tire cavity region encompassed by a tire and a rim, as tire information;
      a transmitter configured to wirelessly transmit the detected tire information; and
      a housing that covers the sensor and the transmitter, the housing including a surface that defines an opening that connects an internal space within the housing and the tire cavity region, the opening extending in an extending direction on the surface of the housing while forming a shape of a straight line, a curved line, or a combination of a straight line and a curved line, and a maximum value of an opening width orthogonal to the extending direction of the opening being not more than 0.8 mm;
   the reception device being configured to receive the tire information transmitted by the transmitter; and
   the monitoring part being configured to determine a presence or absence of an abnormality of the tire on the basis of the tire information, and to report a result of the determination.

10. The tire condition monitoring system according to claim 9, wherein
   the opening includes a portion, on either side in the extending direction, having an opening width that becomes narrower as the opening proceeds toward either side in the extending direction.

11. The tire condition monitoring system according to claim 9, wherein
   when the opening has a linear outside opening edge of an air inlet hole that penetrates the housing, and an inside opening edge of the air inlet hole faces an internal space of the air inlet hole, an opening width of the inside opening edge being wider than an opening width of the linear outside opening edge.

12. The tire condition monitoring system according to claim 9, wherein
   the outer surface of the housing includes a projecting part that projects into the tire cavity region, and the opening crosses a slanted part or a top part of the projecting part.

13. The tire condition monitoring system according to claim 1, wherein
   the outer surface of the housing includes a projecting part that projects into the tire cavity region, and the opening crosses a top part of the projecting part; and
   the opening is provided so that a direction of a line that connects both end parts of the opening is within a range of ±30 degrees with respect to a tire width direction of a mounted tire.

14. The tire condition monitoring system according to claim 12, wherein outer surfaces of the top part and the slanted part of the projecting part are treated with a water repelling treatment.

15. The tire condition monitoring system according to claim 9, wherein
a ratio of a length of the opening in the extending direction is at least three times the maximum value of the opening width of the opening.

16. The tire condition monitoring system according to claim 12, wherein
the projecting part of the transmission device is provided on the outer surface of the housing to face outside in a tire radial direction of the tire.

17. The transmission device according to claim 2, wherein
when the opening has a linear outside opening edge of an air inlet hole that penetrates the housing, and an inside opening, edge of the air inlet hole faces an internal space of the air inlet hole, an opening width of the inside opening edge being wider than an opening width of the linear outside opening edge.

18. The transmission device according to claim 2, wherein
the outer surface of the housing includes a projecting part that projects into the tire cavity region, and the opening crosses a slanted part or a top part of the projecting part.

19. The tire condition monitoring system according to claim 10, wherein
when the opening has a linear outside opening edge of an air inlet hole that penetrates the housing, and an inside opening edge of the air inlet hole faces an internal space of the air inlet hole, an opening width of the inside opening edge being wider than an opening width of the linear outside opening edge.

20. The tire condition monitoring system according to claim 10, wherein
the outer surface of the housing includes a projecting part that projects into the tire cavity region, and the opening crosses a slanted part or a top part of the projecting part.

* * * * *